May 14, 1968 — R. J. KOPF — 3,382,751

FASTENER AND ATTACHMENT FOR PISTON-TYPE FASTENING TOOL

Filed Jan. 12, 1966

INVENTOR:
ROWLAND J. KOPF
BY H. Samuel Kieser
ATTORNEY

United States Patent Office 3,382,751
Patented May 14, 1968

3,382,751
FASTENER AND ATTACHMENT FOR PISTON-TYPE FASTENING TOOL
Rowland J. Kopf, North Haven, Conn., assignor to Olin Mathieson Chemical Corporation, a corporation of Virginia
Filed Jan. 12, 1966, Ser. No. 520,149
7 Claims. (Cl. 85—10)

ABSTRACT OF THE DISCLOSURE

A fastener assembly for use in a piston-type power actuated tool. The fastener assembly includes a fastener member having a shank portion with a head at one end and a tapered tip at the other end. The fastener is provided with an attachment having a tubular body and a flange portion at the forward end of the body. The internal surface of the attachment conforms to the shape of the shank of the fastener with the attachment being mounted on the shank of the fastener with a friction fit and so positioned that the flange portion of the attachment, which has a forward planar surface extending substantially perpendicular to the axis of the shank of the fastener, is positioned adjacent the forward end of the fastener tip.

---

This invention relates generally to power-actuated tools and more particularly, to a fastener having an attachment especially adapted for use in power-actuated tools of the piston type.

There are certain problems that arise in connection with power-actuated tools that utilize a piston member to drive the fastener into the work surface which are not present in tools of the free-flight type wherein the gases generated by the power means act directly upon the fastener. One such problem is the tendency for the piston to fail after a relatively few number of fastening operations. It is theorized that the shock waves in the piston member caused by the repeated impact of driving the fastener reorientate the molecules within the metal. The metal, with the rearranged molecular structure is highly susceptible to failure if the piston member is overdriven to the point where it contacts a stop member. Accordingly, there is a necessity for buffer means which absorb the energy of the piston at the proper time and prevent abrupt contact with a stop member if the piston is overdriven.

Another problem occurring in tools of the piston type is the fact that fasteners designed for use in the free-flight type of tool are not suitable. In a free-flight tool, the fastener travels at a relatively high velocity during the fastening operation and tends to go into the work surface straight even though the tip of the fastener might contact a cross-sectional area of the work material which is relatively hard as compared with adjacent material. On the other hand, in the piston-type of tool, the fastener is being driven by the piston member at a relatively low velocity. Because of this relatively low velocity, the fastener has a tendency to bend as its tip portion bits a hard area in the workpiece. Moreover, with the piston-type tool, because of the low velocity, there is an increased tendency for the work surface to spall as the fastener is driven.

With a view toward overcoming the above-mentioned problems, it is an object of this invention to provide a fastener having an attachment especially designed for use in a power-actuated tool of the piston type.

More specifically, it is an object of this invention to provide buffer means especially adapted for use with a power-actuated tool of the piston type.

Another object of this invention is to provide an improved buffer means for use with a piston-type power-actuated tool which is attached to and remains a part of the fastener.

Yet another object of this invention is to provide a buffer means in connection with a fastener especially designed for use in power-actuated tools of the piston type wherein the buffer also serves as a centering and guiding means for the fastener throughout the entire fastening stroke.

Still another object of this invention is to provide a fastener especially equipped with an attachment for minimizing spalling of the work surface as the fastener is driven.

These and other objects of this invention will be more apparent by reference to the following description and to the accompanying drawings in which.

Figure 1:
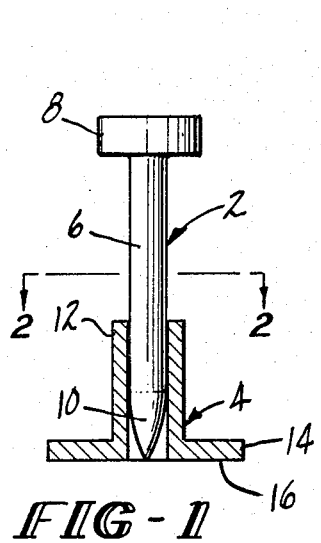
FIGURE 1 is a side view, partially in cross section, of the fastener and fastener attachment constructed in accordance with this invention.

Referring now to the drawings, FIGURE 1 shows a fastener, indicated generally by 2, equipped with a fastener attachment 4. The fastener 2 may include a cylindrical shank portion 6, a head portion 8 at one end of the shank portion 6 and a tip portion 10 at the other end of the shank portion 6.

The fastener attachment 4 includes a generally tubular body 12 having a generally circular flange portion 14 at the forward end thereof. The tubular body 12 is positioned about the shank portion 6 of the fastener 2 and overlaps the tip portion 10 such that the forward face 16 of the flange portion 14 is substantially flush with the forward tip portion 10 of the fastener.

In accordance with the preferred embodiment of this invention, the outside diameter of the tubular portion 12 of the attachment 4 should be no bigger than the head portion 8 of the fastener 2. The outside diameter of the flange portion 14, however, should be greater than the outside diamension of the head portion 8.

The dimensions of the inside surface of the tubular body portion 12 of the attachment 4 and shank portion 6 of the fastener should be such that a tight fit exists therebetween so that a substantial force is exerted by the forward face 16 of the flange portion 14 on the work surface as the fastener is being driven. In the preferred embodiment of the invention, this force averages about 100 pounds during the time there is relative movement between the attachment 4 and fastener 2.

Figure 4:
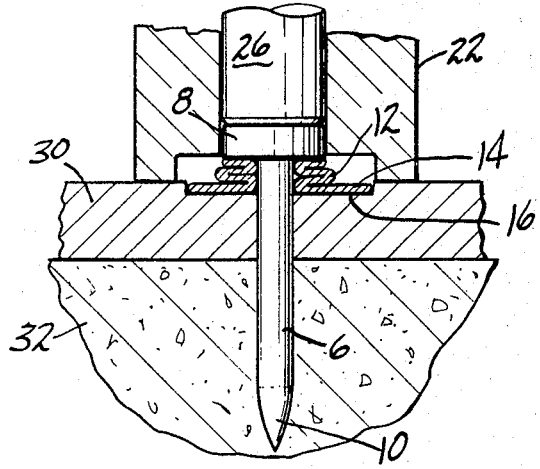
FIGURE 4 is a view similar to that of FIGURE 3 but showing the parts after the fastening has been completed.

Although there are many materials from which the attachment 4 can be fabricated, in the preferred form this material is steel, as steel has been found to give the desired buffering qualities. As an example of these qualities, the preferred form of the attachment 4 is such that the tubular portion 12 will begin to collapse when a force of 800 pounds is applied and, as it reaches the closed accordioned position, such as shown in FIGURE 4, will resist a force of up to 2,000 pounds.

Figure 3:
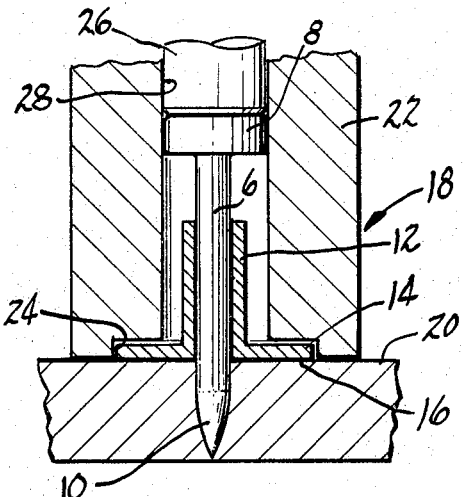
FIGURE 3 is a cross sectional view of the fastener and fastener attachment positioned within the muzzle bushing of a piston-type tool and showing the component parts positioned during one phase of the penetration of the fastener.
Figure 2:
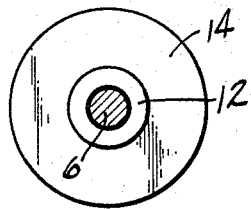
FIGURE 2 is a sectional view taken along lines 2—2 of FIGURE 1.

For a better understanding of how the objects of this invention are achieved through the use of the fastener 2 and attachment 4, reference may be had to FIGURE 3 which shows the fastener positioned in a tool 18 after the fastener has been driven a portion of the way into the work surface 20. As has been stated above, this fastener 2 is especially designed for use in a power-actuated tool of the piston type and accordingly, a tool with which this fastener may be used may include a muzzle bushing 22 having a counter bore 24 in the forward end thereof for reception of the flange portion 14 of the fastener attachment 4. A piston member 26 is mounted within the bore 28 of the muzzle bushing 22 and acts upon the head 8 of the fastener to drive it into the work material. As can be seen in FIGURE 3, as the fastener is being driven, its shank is supported by the tubular column 12 of the attachment 4 during the entire fastening operation. Moreover, due to the tight fit between the shank 6 of the fastener 2 and the interior surface of the tubular portion 12 of the attachment 4, there is a downward force exerted by the forward face 16 of the flange portion 14 on the work surface 20. This force tends to reduce spalling of the work surface 20.

As the piston member 26 continues to drive the fastener into the work surface, the underside of the head portion 8 engages the top of the tubular portion 12 and tends to collapse the attachment 4. In so doing, a portion of the energy of the piston is absorbed. At the end of the normal power stroke, the tubular member tends to become completely collapsed as shown in FIGURE 4 with the result that a large amount of force is resisted by the attachment 4. It has been found that the attachment 4 can absorb about 50 ft.-lb. of the kinetic energy of the piston at the point wherein the attachment member is just about completely collapsed.

Figure 5:
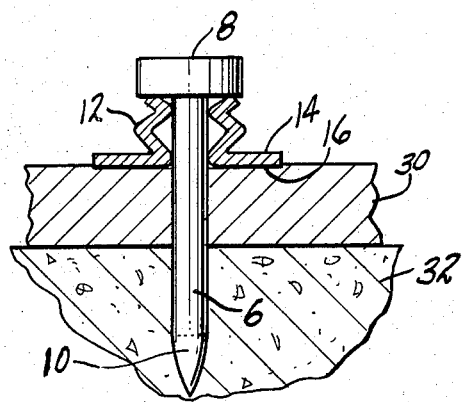
FIGURE 5 is a partial sectional view of the fastener and fastener attachment and workpieces showing the arrangement of the respective parts in the case where the fastener has not completely penetrated the workpieces.

An additional feature of this invention is the fact that the attachment 4 acts as a compensating head in the event that the fastener is not completely driven into the workpieces. This feature is shown in FIGURE 5 wherein, although the head 8 is spaced from the surface of the workpieces 30 and 32, the attachment 4 exerts a force between the top surface 34 of the workpiece 30 and the underside of the head portion 8 which tends to keep the two pieces firmly attached. If the attachment 4 were not provided in such a case, the top workpiece 30 would then separate from the bottom workpiece 32 since there would be no forces acting to hold them together.

While reference has been made to a preferred embodiment, it is intended that the scope of this invention be ascertained by reference to the following claims.

What is claimed is:

1. In combination, a fastener including a shank having a head portion at one end and a tapered tip portion at the other end and a one-piece attachment having a tubular body and a flange portion at the forwardmost end of said tubular body, the internal surface of said attachment conforming to the shape of said shank portion, said attachment being mounted on said shank portion with the internal surface of said body engaging the shank portion with a friction fit over a portion of the length of said attachment such that a force of at least 100 pounds is necessary to sustain relative movement therebetween, said flange portion having a forward planar surface extending substantially perpendicular to the axis of said shank portion and positioned adjacent the forward end of said tip portion.

2. The combination according to claim 1 wherein a force of at least 2000 pounds is required to completely collapse said tubular member.

3. The combination according to claim 2 wherein said shank portion and said head portion are generally cylindrical and wherein the diameter of said head portion is greater than the diameter of said body portion and less than the diameter of said flange portion.

4. The combination according to claim 3 wherein said attachment is fabricated from steel.

5. In combination, a fastener including a shank portion, a head portion at one end of said shank portion, and a tapered tip portion at the other end of said shank portion, and a one-piece metallic attachment having a tubular body and a flange portion at the forwardmost end of said body, the internal surface of said attachment conforming to the shape of said shank portion with the internal surface of said body engaging the shank portion over a portion of the length of said attachment with a friction fit such that a force of at least 100 pounds is necessary to sustain relative movement therebetween, said flange portion having a forward planar surface extending substantially perpendicular to the axis of said shank portion and positioned adjacent the forward end of said tip portion, said attachment requiring a force of at least 2000 pounds to completely collapse said tubular portion.

6. The combination of claim 5 wherein said shank portion and said head portion are generally cylindrical and wherein the diameter of said head portion is greater than the diameter of said body portion and less than the diameter of said flange portion.

7. The combination of claim 6 wherein said attachment is fabricated from steel.

References Cited

UNITED STATES PATENTS

| 2,761,348 | 9/1956 | Williams et al. | 227—9 X |
| 2,930,042 | 3/1960 | Temple et al. | 227—10 |

FOREIGN PATENTS

| 518,452 | 3/1953 | Belgium. |
| 1,099,807 | 2/1961 | Germany. |

WILLIAM W. DYER, JR., *Primary Examiner.*

GRANVILLE Y. CUSTER, *Examiner.*

F. T. YOST, *Assistant Examiner.*